United States Patent
Curme et al.

(10) Patent No.: US 11,494,425 B2
(45) Date of Patent: Nov. 8, 2022

(54) SCHEMA-INFORMED EXTRACTION FOR UNSTRUCTURED DATA

(71) Applicant: S&P Global Inc., New York, NY (US)

(72) Inventors: Chester Curme, Boston, MA (US); Delphine Vendryes, Venice, CA (US); Baojia Tong, Cambridge, MA (US); Matthew Theisen, Los Angeles, CA (US); David Relyea, Los Angeles, CA (US)

(73) Assignee: S&P Global Inc., New York, NY (US)

( * ) Notice: Subject to any disclaimer, the term of this patent is extended or adjusted under 35 U.S.C. 154(b) by 138 days.

(21) Appl. No.: 16/779,833

(22) Filed: Feb. 3, 2020

(65) Prior Publication Data

US 2021/0240752 A1 Aug. 5, 2021

(51) Int. Cl.
*G06F 16/33* (2019.01)
*G06F 40/205* (2020.01)
*G06F 16/332* (2019.01)
*G06F 40/30* (2020.01)

(52) U.S. Cl.
CPC ...... *G06F 16/3344* (2019.01); *G06F 16/3329* (2019.01); *G06F 16/3334* (2019.01); *G06F 40/205* (2020.01); *G06F 40/30* (2020.01)

(58) Field of Classification Search
CPC .................................................. G06F 16/3344
See application file for complete search history.

(56) References Cited

U.S. PATENT DOCUMENTS

| | | | |
|---|---|---|---|
| 7,849,048 B2 | 12/2010 | Langseth et al. | |
| 2006/0242180 A1 | 10/2006 | Graf et al. | |
| 2007/0003147 A1* | 1/2007 | Viola | G06F 40/211 |
| | | | 382/229 |
| 2009/0319515 A1* | 12/2009 | Minton | G06F 16/215 |
| | | | 707/999.005 |
| 2012/0197862 A1* | 8/2012 | Woytowitz | G06F 16/36 |
| | | | 707/E17.109 |
| 2015/0154164 A1* | 6/2015 | Goldstein | G06F 40/194 |
| | | | 715/229 |
| 2018/0314705 A1* | 11/2018 | Griffith | G06F 16/185 |

OTHER PUBLICATIONS

Christen, "Data-Matching—Concepts and Techniques for Record Linkage, Entity Resolution, and Duplicate Detection," Data-Centric Systems and Applications, Springer, Jul. 5, 2012, 26 pages.
(Continued)

*Primary Examiner* — Van H Oberly
(74) *Attorney, Agent, or Firm* — Yee & Associates, P.C.

(57) ABSTRACT

A method of extracting data from documents is provided. The method comprises receiving input of a number of documents and input of a schema of data items available for extraction from the documents. The documents are parsed into a machine-readable representation, and data items in the machine-readable representation are identified according to the schema. Interpretations of data items are propagated within the documents to disambiguate identified data items, and identified data items are matched with other data items in the documents according to the schema. Only identified data items that include a minimal set of interpretations specified by the schema are extracted.

24 Claims, 6 Drawing Sheets

(56) References Cited

OTHER PUBLICATIONS

Bilenko, "Learnable Similarity Functions and Their Applications to Clustering and Record Linkage", Proceedings of the Ninth AAAI/SIGART Doctoral Consortium, San Jose, CA, Jul. 2004, 2 pages.

He et al., Deep Residual Learning for Image Recognition, Computer Vision and Pattern Recognition (CVPR), 2016, 9 pages.

Yao, "Universal Schema for Knowledge Representation from Text and Structured Data," Doctoral Dissertation, University of Massachusetts Amherst, Feb. 2015, 144 pages. https://scholarworks.umass.edu/dissertations_2/338.

Geetha et al., "Automatic Relational Schema Extraction from Natural Language Requirements Specification Text," Middle East Journal of Scientific Research, vol. 21, (3), 2014, 8 pages.

* cited by examiner

210

|  | 2019 H1 | 2019 H2 | 2020 H1 | 2020 H2 |
|---|---|---|---|---|
| EPS ($) | 1 | 2 | 3 | 4 |
| REVENUE ($M) | 5 | 6 | 7 | 8 |

| EARNINGS PER SHARE (IN $) | 2019 | 2020 |
|---|---|---|
| HALF 1 | 1 | 3 |
| HALF 2 | 2 | 4 |

| REVENUE ($, IN MILLIONS) | 2019 | 2020 |
|---|---|---|
| HALF 1 | 5 | 7 |
| HALF 2 | 6 | 8 |

| METRIC | PERIOD | VALUE | CURRENCY | SCALE |
|---|---|---|---|---|
| EPS | 2019 H1 | 1.0 | USD | ABSOLUTE |
| EPS | 2019 H2 | 2.0 | USD | ABSOLUTE |
| EPS | 2020 H1 | 3.0 | USD | ABSOLUTE |
| EPS | 2020 H2 | 4.0 | USD | ABSOLUTE |
| REVENUE | 2019 H1 | 5.0 | USD | MILLIONS |
| REVENUE | 2019 H2 | 6.0 | USD | MILLIONS |
| REVENUE | 2020 H1 | 7.0 | USD | MILLIONS |
| REVENUE | 2020 H2 | 8.0 | USD | MILLIONS |

FIG. 3

SCHEMA-INFORMED EXTRACTION FOR UNSTRUCTURED DATA

BACKGROUND INFORMATION

1. Field

The present disclosure relates generally to an improved system and method, which can be embodied in an apparatus, computer system, or computer program product, for extracting unstructured data from documents.

2. Background

Unstructured documents, e.g., PDFs, may organize information in a way that is understandable to humans but not to machines. For example, texts can be arranged on a page in a tabular form, so that row or column headers might be associated with values in the body of the table, but it is non-trivial for a computer to identify this tabular structure and associate its contents correctly. This complicates the automated extraction of information from such documents.

Therefore, it would be desirable to have a method and apparatus that take into account at least some of the issues discussed above, as well as other possible issues.

SUMMARY

An embodiment of the present disclosure provides a method of extracting data from documents. The method comprises receiving input of a number of documents and input of a schema of data items available for extraction from the documents. The documents are parsed into a machine-readable representation, and data items in the machine-readable representation are identified according to the schema. Interpretations of data items are propagated within the documents to disambiguate identified data items, and identified data items are matched with other data items in the documents according to the schema. Only identified data items that include a minimal set of interpretations specified by the schema are extracted.

Another embodiment provides a system for extracting data from documents. The system comprises a storage device configured to store program instructions, and one or more processors operably connected to the storage device and configured to execute the program instructions to cause the system to: receive input of a number of documents; receive input of a schema of data items available for extraction from the documents; parse the documents into a machine-readable representation; identify data items in the machine-readable representation according to the schema; propagate interpretations of data items within the documents to disambiguate identified data items; match identified data items with other data items in the documents according to the schema; and extract only identified data items that include a minimal set of interpretations specified by the schema.

Another embodiment provides a computer program product for extracting data from documents. The computer program product comprises a non-volatile computer readable storage medium having program instructions stored thereon to perform the steps of: receiving input of a number of documents; receiving input of a schema of data items available for extraction from the documents; parsing the documents into a machine-readable representation; identifying data items in the machine-readable representation according to the schema; propagating interpretations of data items within the documents to disambiguate identified data items; matching identified data items with other data items in the documents according to the schema; and extracting only identified data items that include a minimal set of interpretations specified by the schema.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2A illustrates an example of financial data in tabular with which the illustrative embodiments can be implemented;

FIG. 2B illustrates an alternative tabular presentation of the data shown in FIG. 2A;

FIG. 3 illustrates an example tabular representation of data conformed to a specified schema in accordance with an illustrative embodiment;

DETAILED DESCRIPTION

Figure 1:
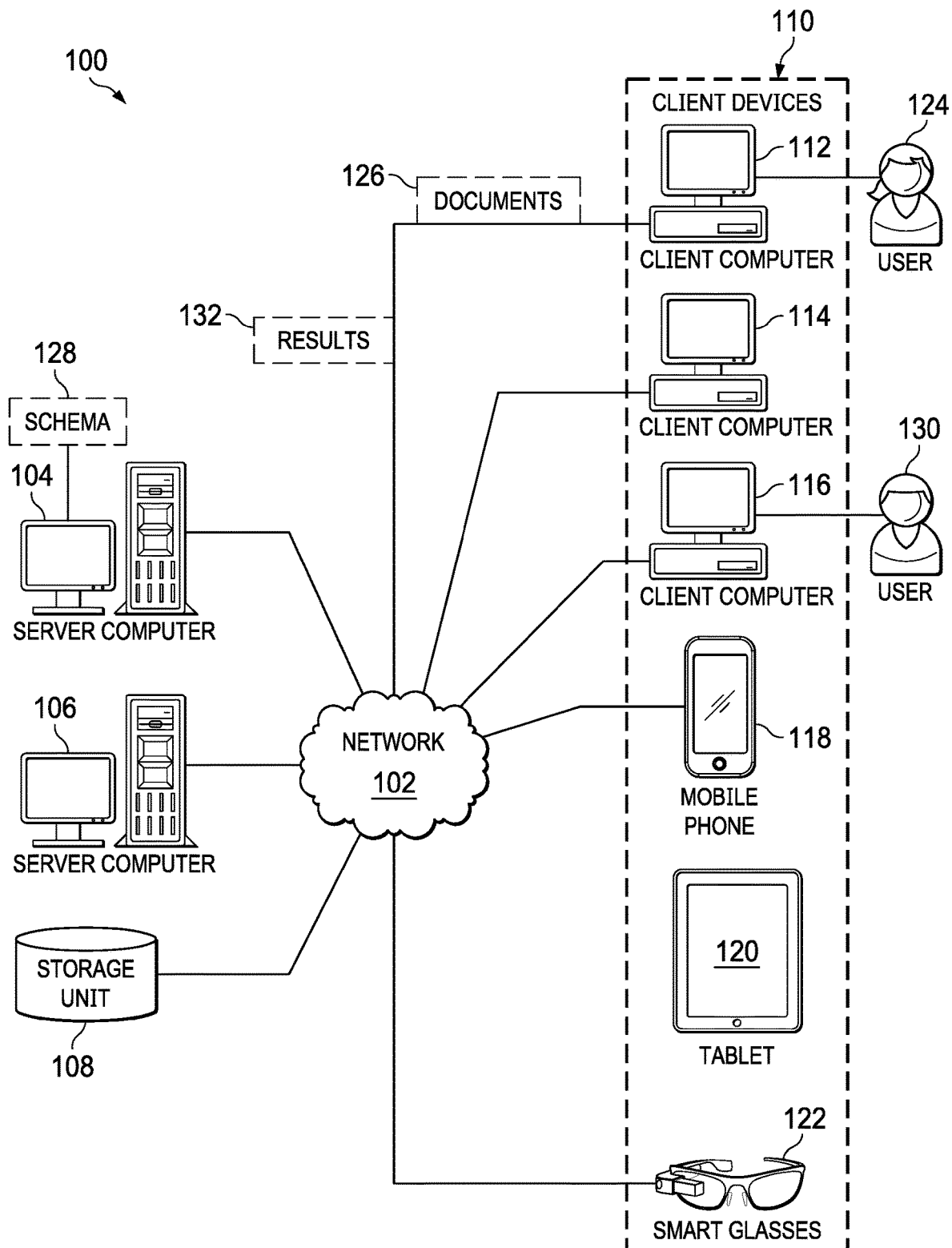
FIG. 1 is a pictorial representation of a network of data processing systems in which illustrative embodiments may be implemented.

The illustrative embodiments recognize and take into account one or more different considerations. The illustrative embodiments recognize and take into account that unstructured documents, e.g., PDFs, may organize information in a way that is understandable to humans but not to machines. For example, texts can be arranged on a page in a tabular form, so that row or column headers might be associated with values in the body of the table, but it is non-trivial for a computer to identify this tabular structure and associate its contents correctly. This complicates the automated extraction of information from such documents.

The illustrative embodiments also recognize and take into account that current methods include parsing components of unstructured documents into machine-readable formats, e.g., identifying and parsing tables, forms, and free-text. Commercial products exist that accept a raw document (including images or scans of documents), identify, and segment structures from the document, and return their contents in a machine-readable form (e.g., Excel, CSV, or JSON files).

These solutions are faithful to the structures as they are represented on the page. However, remaining faithful to the structures as represented on page is inadequate if a user intends to database information that is represented in documents that vary in format or presentation.

The illustrative embodiments provide a method to inform automated data-extraction tasks from both structured and unstructured documents (e.g., PDF and HTML documents, management presentations, etc.) using a prior-known schema or knowledge base. This process includes the parsing of data from tables, free-floating text, and charts or graphs; the disambiguation of references to known quantities (e.g., the disambiguation of dates or periods, or of common references to financial line items); and analysis to link these quantities to an existing database schema or knowledge base. This process also includes the use of the knowledge base to improve parsing of information from raw documents (e.g., by improving the determination of table headers or titles).

The extraction service might be accessed via an application programming interface (API) that allows a user to pass in a minimal set of information. Specifically, the user might establish (1) what entities he or she is looking for in the document; (2) aliases for these entities, or other means of identifying mentions of these entities in text; and (3) what combinations of entities should be extracted together.

For example, the user might indicate that a document could contain two types of data items: a numeric item, such as dollars of revenue, which is accompanied with units, and a text item, such as a positive or negative recommendation, which is not accompanied by units. For each entity (including units), the user supplies aliases that assist the system in identifying the entity. This process enables the development of an end-to-end automated structured data extraction system. Schemas are passed to the system via an API. The schemas can be associated with sets of documents, and a unique implementation is then used to perform data extraction.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 at client computer 112 can send documents 126 for analysis on server computer 104. In this illustrative example, server computer 104 might extract data items from documents 126 according to a schema 128 received from user 130 operating client computer 116.

FIG. 2A illustrates an example of financial data in tabular with which the illustrative embodiments can be implemented. FIG. 2B illustrates an alternative tabular presentation of the data shown in FIG. 2A.

Tables 210 and 220 contain the same substantive data in different formats, which might be found in different documents. If a user intends to add the information in tables 210 and 220 to a database or knowledgebase the underlying structure of the information must be understood. A knowledgebase in this case might contain a notion of an observation of a financial metric, including, e.g., the universe of possible metrics and their aliases, whether a metric is paired with a temporal period, and whether metrics are reported with specific units and scales.

FIG. 3 illustrates an example tabular representation of data conformed to a specified schema in accordance with an illustrative embodiment. Table 300 contains the same data contained in tables 210 and 220 arranged according to the schema, such as e.g., schema 128 in FIG. 1, which allows the data to resolved consistently to a knowledgebase.

Figure 4:
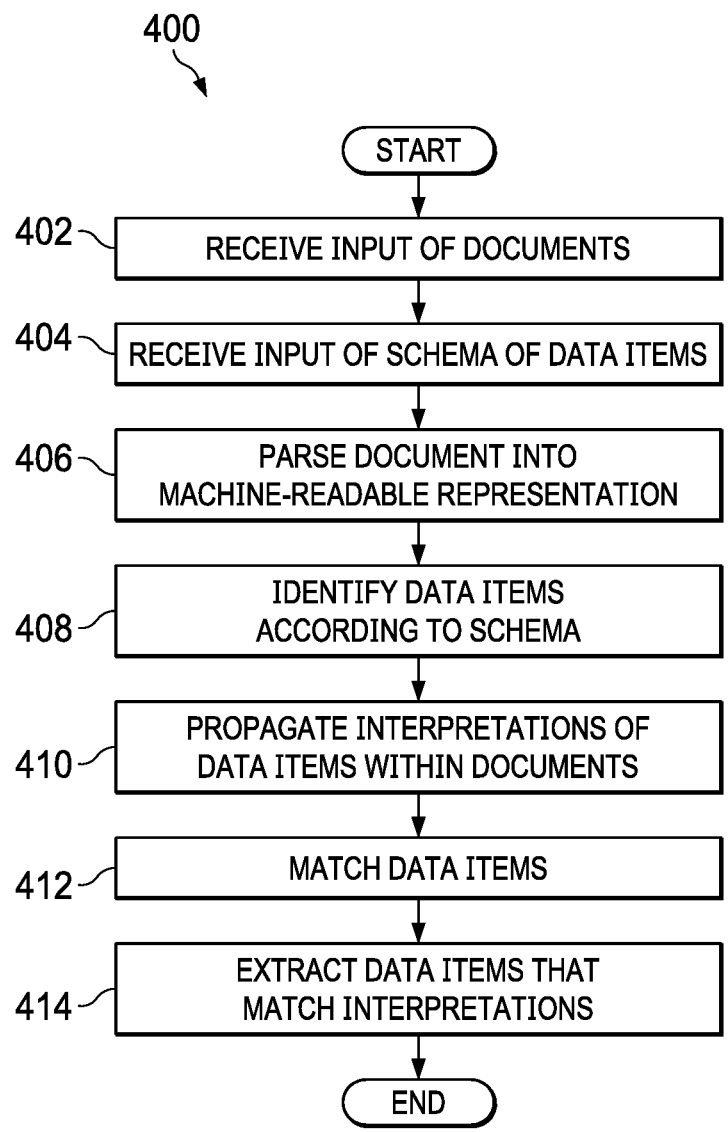
FIG. 4 illustrates a flowchart of a process for extracting unstructured data from documents in accordance with an illustrative embodiment.

FIG. 4 illustrates a flowchart of a process for extracting unstructured data from documents in accordance with an illustrative embodiment. Process 400 can be implemented in a computer system such as data processing system 100 in FIG. 1 to extract data from a plurality of documents and conform the data to a specified knowledgebase as shown in FIG. 3.

Process 400 begins by receiving input of a number of documents (step 402) and input of a schema of data items available for extraction from the documents (step 404).

The documents are then parsed into a machine-readable representation (step 406). Data items are then identified in the machine-readable representation according to the schema (step 408). For example, each cell in a table, along with the table headers, titles, and subtitles might be identified. Process 400 can make an informed guess about the type of information contained in the text and provide low-level interpretations for the content of the cell, if it is recognized. Ambiguous or conflicting interpretations can be kept intentionally. It may be the case that much of the text in a document is not matched to any entity in the knowledgebase schema.

Interpretations of data items are propagated within the documents to disambiguate identified data items (step 410). The path over which an interpretation is propagated varies with the document structure. For example, for tabular data, interpretations of data items can be propagated across rows and down columns. For floating text, geometric and semantic information can be used to propagate the interpretation for a matched item (e.g., "Revenue:") to its corresponding value.

Having attempted to resolve individual textual elements to entities in a schema, disambiguation might be supplemented using surrounding or document-level information or metadata. For example, the text "12/2019" might have been disambiguated to the period "December 2019." If this text appears as a column header alongside "12/2018" and "12/2020", however, it is likely that the interpretation corresponds to an annual period. Document metadata can also be applied. For example, if a document describes an Australian company, a "$" sign likely refers to Australian dollars, whereas the same text may disambiguate to Canadian dollars for a Canadian company.

Identified data items are then matched with other data items in the documents according to the schema (step 412). The identified data items can be matched with other data according to relationships specified in the schema.

Only identified data items that include a minimal set of interpretations specified by the schema are extracted (step 414). Having propagated and disambiguated the interpretations, process 400 filters those that conform to the schema expected by the knowledgebase. For example, if the knowledgebase pairs financial metrics with periods, and the number "5" has been associated with the entity "revenue," but has not been associated with a period, the information is discarded. All extracted records are returned in a machine-readable form (e.g., JSON) so that they can be persisted by the user in a database or knowledgebase.

Figure 5:
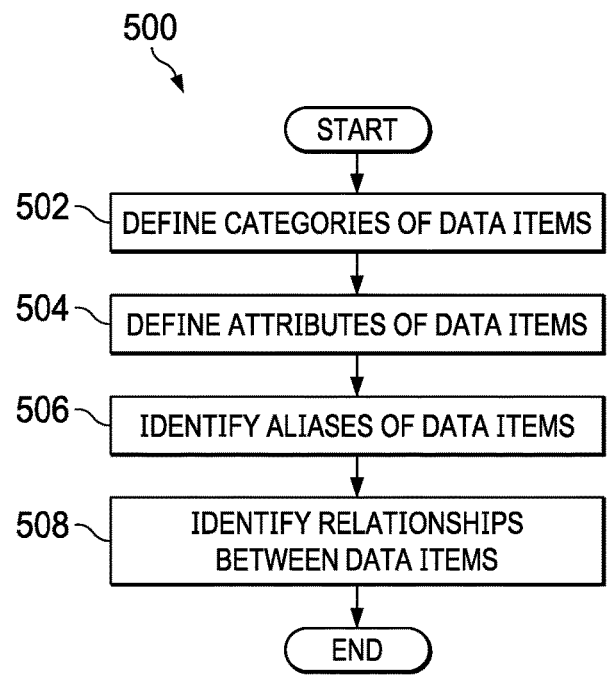
FIG. 5 illustrates a flowchart of a process for constructing a knowledgebase schema in accordance with an illustrative embodiment.

FIG. 5 illustrates a flowchart of a process for constructing a knowledgebase schema in accordance with an illustrative embodiment. Process 500 might be used to construct a schema applied in process 400 in FIG. 4.

The schema provides a structure for what kind of data are sought in the documents (e.g., numeric values, financial periods, financial metrics, accounting standards, units, currencies and scales, etc.), how to find that information (aliases), and where the information is expected to be located (free floating text, table content, table headers, etc.). Process 500 begins by defining a number of categories into which data items in documents might be classified (step 502). Examples of categories might include names, financial categories, dates, numbers, etc.

Attributes are then defined for data items in the different categories (step 504). For example, an attribute would indicate whether the data item is numeric or text.

Aliases are identified for the data items (step 506). Aliases might comprise historical or colloquial names for a company, financial metric, or other entity identifier. For example, "Rev." might be an alias for revenue. As another example, "EPS" might be an alias for earning per share. Aliases might also include alternate formatting such as those used for dates.

Relationships between data items are identified (step 508). Relationships refer to types of data items that are typically closely associated with each other. For example, a financial metric such a revenue or earnings per share is likely to be associated with a time period, currency, or scale. As another example, in a cookbook, the amount of an ingredient is likely associated with a unit of measurement, e.g., cup, ounce, tablespoon, etc.

Figure 6:
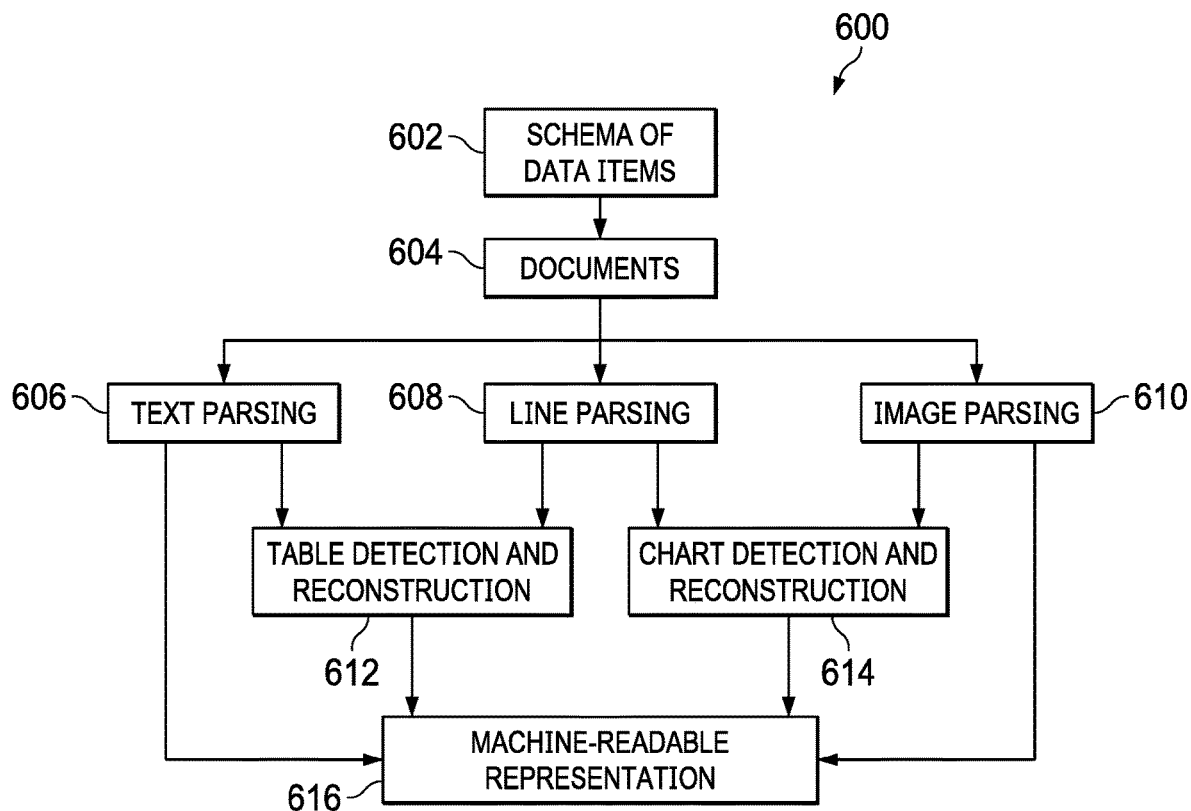
FIG. 6 illustrates a flowchart of a process for parsing documents in accordance with an illustrative embodiment.

FIG. 6 illustrates a flowchart of a process for parsing documents in accordance with an illustrative embodiment. Process 600 is a detailed example of parsing step 406 in FIG. 4.

Staring with a schema of data items 602 (e.g., defined by process 500), when documents 604 are received, process 600 engages in concurrent text parsing 606, line parsing 608, and image parsing 610 of the documents to decompose each document into sub-component texts, lines, and images.

Texting parsing 606 parses the content and location of the text, font information, and sizing. Software can aggregate text elements from individual characters into words and paragraphs. Line parsing 608 might comprise identifying the location, color, width, and font styles of lines in the documents. Image parsing might comprise identifying image files and the locations of the images on a page.

From the constituent components of text, lines and images, process 600 detects and reconstructs table structures 612 and chart structures 614. To detect and reconstruct table structures step 612 might determine a bounding box for each table on a page, if any. These bounding boxes might be generated from a convolutional neural network, e.g., using the ResNet architecture, or deduced from rules governed by the alignment and repetition of text boxes.

Content of each table can be agglomerated based on the relative position of text boxes. This agglomeration might include assignment of text boxes to rows and columns and the identification of table headers, captions, titles and subtitles. The relationships between data items in the schema might be used to inform this step, e.g., to assist in the identification of row and column headers. A bounding box for each table can also be used in this step to inform the extent of the table, i.e., what textual elements it might contain.

To detect and reconstruct charts structures step 614 might identify curvatures and histogram, or bar chart based on unique alignments of points in a line. Pie charts might be identified based on color patterns and label (i.e. number pairing information).

An axis of curvature of a chart can be located and the axis ticks aligned with the curve. The curve can then be translated from document locations to numerical data. Furthermore, title, legend, and footnote might be detected and saved with the chart information.

Free text found in document parsing might comprise page number and page title inferred based on textual information. Paragraphs might be agglomerated based on textual information and alignments. Other information on a page such as, e.g., headnotes, footnotes, and section information, might also be detected and added.

The document components identified in parsing steps 606-612 are serialized into a machine-readable representation (e.g., JSON) (step 616). Free-texts, charts, and tables can be treated as three separate components of the final representation and can be separated or combined as a partial final output based on the user needs.

Figure 7:
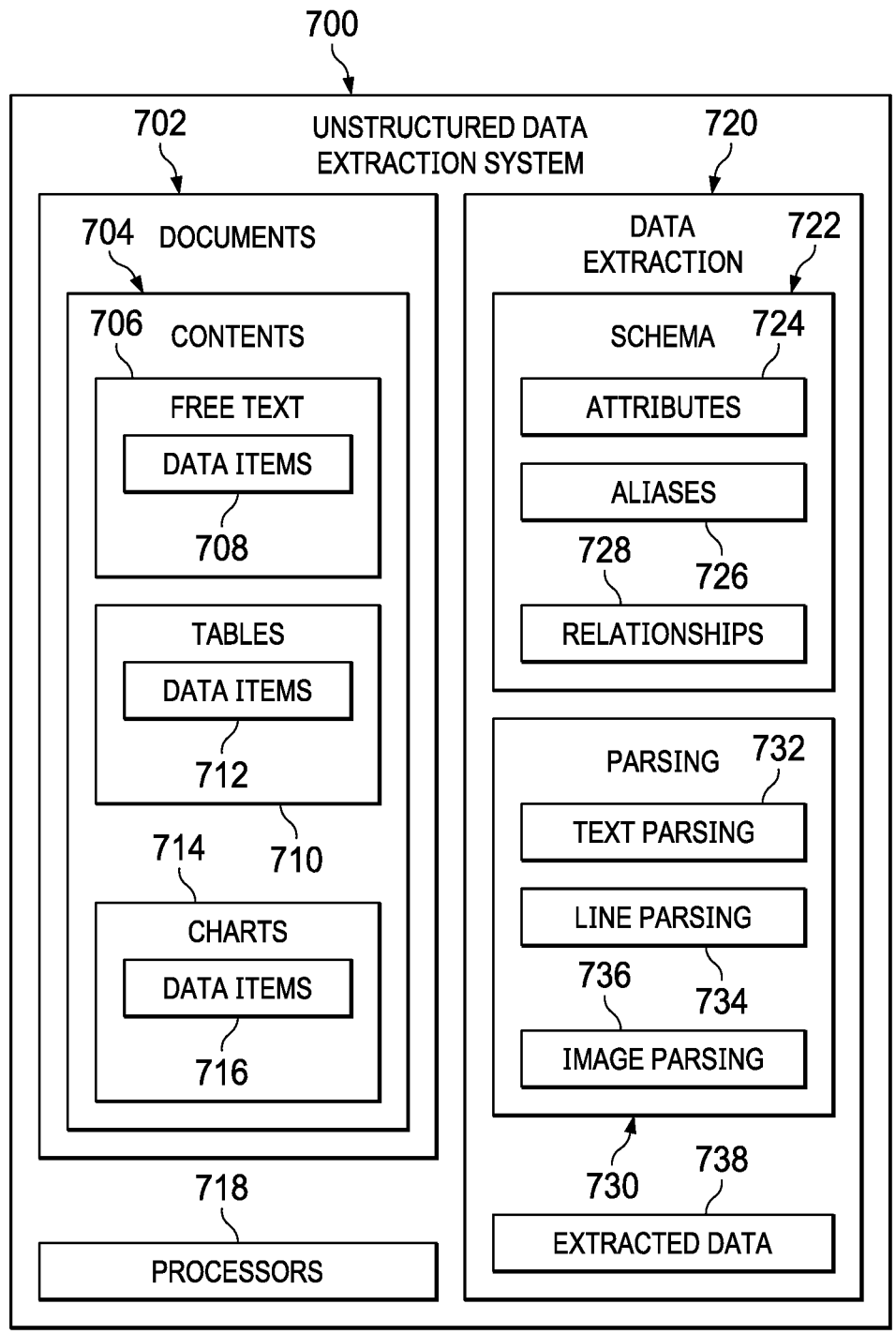
FIG. 7 depicts a block diagram for an extraction system for unstructured data in accordance with an illustrative embodiment.

FIG. 7 depicts a block diagram for an extraction system for unstructured data in accordance with an illustrative embodiment. Data extraction system 700 might be implemented, e.g., in data processing system 100 in FIG. 1.

Data extraction system 700 is configured to extract unstructured data from a number of documents 702. Documents 702 contain contents 704 that can take several forms. For example, the contents 704 might be in the form of free text 706, tables 710, or charts 714. Each one of these categories of contents in turn comprise a number of data items 708, 712, 716, respectively, which can be extracted from the documents 702.

Data extraction system 700 might comprises one or more processors 718 configured to execute data extraction 720.

Data extraction 720 is implemented according to a knowledge base schema 722 of data items. Schema 722 comprises known attributes 724 of data items, known aliases 726 of data items, and specified relationships 728 between data items.

Using the schema 722, data extraction 720 performs parsing 730 on the contents 704 contain in documents 702. Parsing 730 might comprise text parsing 732, line parsing 734, and image parsing 736. Extracted data 738 is produced by parsing 730.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
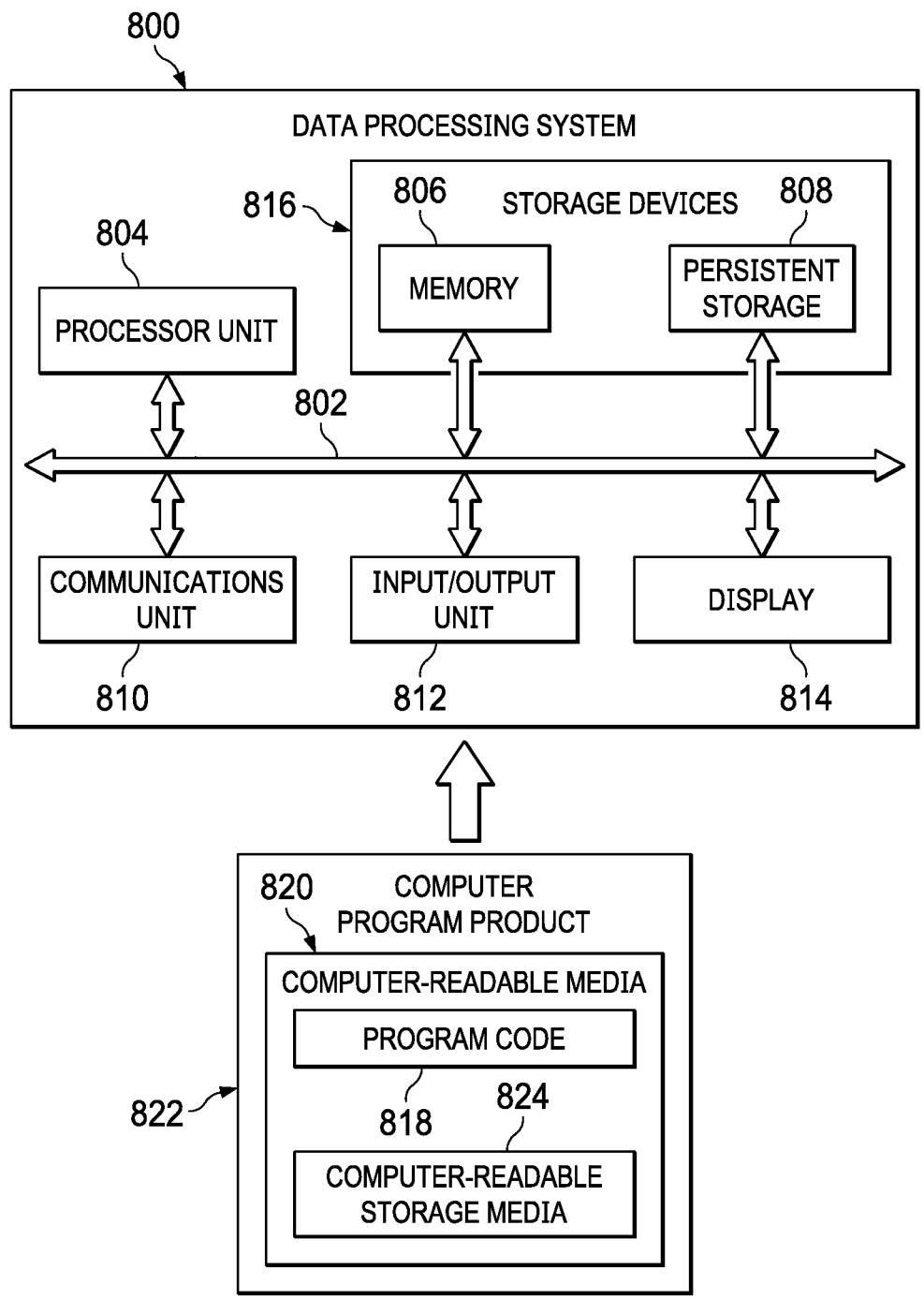
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. In this illustrative example, data processing system 800 includes communications framework 802, which provides communications between processor unit 804, memory 806, persistent storage 808, communications unit 810, input/output (I/O) unit 812 and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in in program code 818 can be located in one data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 806, or portions thereof, may be incorporated in processor unit 804 in some illustrative examples.

Thus, illustrative embodiments by method, apparatus, system, and computer program product for training an artificial intelligence system to recognize the concept. In one illustrative example, an automated. process for creating a training data set comprising documents is performed in a manner that provides an information-rich training data sample for training an artificial intelligence model.

Further, in the illustrative example, artificial intelligence models can be trained by processing this automatically generated training data. In illustrative example, the training of the artificial intelligence model can be performed in a manner that enables artificial intelligence models trained to cover a more diverse set of concepts and to be much larger than those created using current processes. Further, the training data sets generated in the illustrative examples can provide artificial intelligence models that are more accurate, robust, and able to serve a wider range of applications as compared to artificial intelligence models generated current training techniques.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of extracting data from documents, the method comprising:
    using one or more processors to perform the steps of:
        receiving input of a number of unstructured documents comprising forms comprising free text, tables and/or charts;
        receiving input of a knowledgebase schema of data items available for extraction from the unstructured documents, said knowledgebase schema comprising attributes of data items and aliases of data items;
        parsing the unstructured documents into a machine-readable representation;
        identifying data items in the machine-readable representation according to the knowledgebase schema;
        propagating interpretations of data items within the unstructured documents to disambiguate identified data items;
        matching identified data items with other data items in the unstructured documents according to the knowledgebase schema; and
        extracting only identified data items that include a minimal set of interpretations specified by the knowledgebase schema.

2. The method of claim 1, wherein the knowledgebase schema comprises known attributes of data items, known aliases of data items, and specified relationships between data items.

3. The method of claim 2, where in identified data items are matched with other data according to the specified relationships in the knowledgebase schema.

4. The method of claim 1, wherein parsing the unstructured documents comprises:
  text parsing;
  line parsing; and
  image parsing.

5. The method of claim 4, further comprising detecting and reconstructing tables from text, lines, and images.

6. The method of claim 4, further comprising detecting and reconstructing charts from text, lines, and images.

7. The method of claim 1, wherein, for tabular data, interpretations of data items are propagated across rows and down columns.

8. The method of claim 1, wherein, for floating text, interpretation of a matched data item to a corresponding value is propagated according to geometric and semantic information.

9. A system for extracting data from documents, the system comprising:
  a storage device configured to store program instructions; and
  one or more processors operably connected to the storage device and configured to execute the program instructions to cause the system to:
    receive input of a number of unstructured documents comprising forms comprising free text, tables and/or charts;
    receive input of a knowledgebase schema of data items available for extraction from the unstructured documents, said knowledgebase schema comprising attributes of data items and aliases of data items;
    parse the unstructured documents into a machine-readable representation;
    identify data items in the machine-readable representation according to the knowledgebase schema;
    propagate interpretations of data items within the unstructured documents to disambiguate identified data items;
    match identified data items with other data items in the unstructured documents according to the knowledgebase schema; and
    extract only identified data items that include a minimal set of interpretations specified by the knowledgebase schema.

10. The system of claim 9, wherein the knowledgebase schema comprises known attributes of data items, known aliases of data items, and specified relationships between data items.

11. The system of claim 10, where in identified data items are matched with other data according to the specified relationships in the knowledgebase schema.

12. The system of claim 9, wherein parsing the unstructured documents comprises:
  text parsing;
  line parsing; and
  image parsing.

13. The system of claim 12, further comprising detecting and reconstructing tables from text, lines, and images.

14. The system of claim 12, further comprising detecting and reconstructing charts from text, lines, and images.

15. The system of claim 9, wherein, for tabular data, interpretations of data items are propagated across rows and down columns.

16. The system of claim 9, wherein, for floating text, interpretation of a matched data item to a corresponding value is propagated according to geometric and semantic information.

17. A computer program product for extracting data from documents, the computer program product comprising:
  a non-volatile computer readable storage medium having program instructions stored thereon to perform the steps of:
    receiving input of a number of unstructured documents comprising forms comprising free text, tables and/or charts;
    receiving input of a knowledgebase schema of data items available for extraction from the unstructured documents, said knowledgebase schema comprising attributes of data items and aliases of data items;
    receiving input of a number of unstructured documents;
    receiving input of a knowledgebase schema of data items available for extraction from the unstructured documents;
    parsing the unstructured documents into a machine-readable representation;
    identifying data items in the machine-readable representation according to the knowledgebase schema;
    propagating interpretations of data items within the unstructured documents to disambiguate identified data items;
    matching identified data items with other data items in the unstructured documents according to the knowledgebase schema; and
  extracting only identified data items that include a minimal set of interpretations specified by the knowledgebase schema.

18. The computer program product of claim 17, wherein the knowledgebase schema comprises known attributes of data items, known aliases of data items, and specified relationships between data items.

19. The computer program product of claim 18, wherein identified data items are matched with other data according to the specified relationships in the knowledgebase schema.

20. The computer program product of claim 17, wherein parsing the unstructured documents comprises:
  text parsing;
  line parsing; and
  image parsing.

21. The computer program product of claim 20, further comprising detecting and reconstructing tables from text, lines, and images.

22. The computer program product of claim 20, further comprising detecting and reconstructing charts from text, lines, and images.

23. The computer program product of claim 17, wherein, for tabular data, interpretations of data items are propagated across rows and down columns.

24. The computer program product of claim 17, wherein, for floating text, interpretation of a matched data item to a corresponding value is propagated according to geometric and semantic information.

* * * * *